United States Patent
Kim

(10) Patent No.: US 8,755,662 B2
(45) Date of Patent: Jun. 17, 2014

(54) OPTICAL WAVEGUIDE

(75) Inventor: Jin Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 13/550,849

(22) Filed: Jul. 17, 2012

(65) Prior Publication Data

US 2013/0071083 A1    Mar. 21, 2013

(30) Foreign Application Priority Data

Sep. 21, 2011    (KR) .................. 10-2011-0095279

(51) Int. Cl.
*G02B 6/10*    (2006.01)
(52) U.S. Cl.
USPC .................................................. 385/131
(58) Field of Classification Search
USPC ............................................. 385/129–131
See application file for complete search history.

(56) References Cited

U.S. PATENT DOCUMENTS

| | | | |
|---|---|---|---|
| 5,629,532 A * | 5/1997 | Myrick | 257/77 |
| 6,442,321 B1 | 8/2002 | Berini | |
| 6,902,871 B2 | 6/2005 | Dinu et al. | |
| 7,294,292 B2 | 11/2007 | Akutsu et al. | |
| 7,785,557 B2 | 8/2010 | Gruner et al. | |
| 8,213,751 B1 * | 7/2012 | Ho et al. | 385/14 |
| 2003/0086635 A1 * | 5/2003 | Bylsma et al. | 385/14 |
| 2003/0099420 A1 * | 5/2003 | Bhowmik et al. | 385/2 |
| 2010/0072485 A1 * | 3/2010 | Suda et al. | 257/77 |
| 2010/0158445 A1 | 6/2010 | Kim et al. | |
| 2013/0026442 A1 * | 1/2013 | Kim | 257/9 |
| 2013/0071060 A1 * | 3/2013 | Kim | 385/11 |

FOREIGN PATENT DOCUMENTS

| | | |
|---|---|---|
| KR | 10-0877710 B1 | 1/2009 |
| KR | 10-2010-0073244 A | 7/2010 |

\* cited by examiner

*Primary Examiner* — Charlie Peng
*Assistant Examiner* — Mary El Shammaa

(57)    ABSTRACT

An optical waveguide includes: a substrate; a first dielectric layer positioned on the substrate; a graphene layer including graphene formed on the first dielectric layer along the lengthwise direction of the substrate and for transmitting incident light through the graphene; and a second dielectric layer positioned on the first dielectric layer and the graphene layer.

19 Claims, 8 Drawing Sheets

OPTICAL WAVEGUIDE

CROSS-REFERENCE TO RELATED APPLICATION

This application claims priority to and the benefit of Korean Patent Application No. 10-2011-0095279 filed in the Korean Intellectual Property Office on Sep. 21, 2011, the entire contents of which are incorporated herein by reference.

BACKGROUND OF THE INVENTION (a) Field of the Invention

The present invention relates to an optical waveguide.

(b) Description of the Related Art

Planar lightwave circuit (PLC) technology is a technology for fabricating an optical element by forming an optical waveguide serving as an optical communication medium on a planar substrate such as a silicon wafer.

An optical waveguide used for a PLC uses two or more dielectric materials having different refractive indexes. The dielectric material having a higher refractive index forms an optical waveguide having a rectangular or circular cross-section, and an optical signal is transmitted through the optical waveguide. A variety of expensive semiconductor processes, such as etching, deposition, etc., are required to form an optical waveguide.

SUMMARY OF THE INVENTION

The present invention has been made in an effort to provide a cost-effective optical waveguide.

An exemplary embodiment of the present invention provides an optical waveguide. The optical waveguide includes: a substrate; a first dielectric layer positioned on the substrate; a graphene layer including graphene formed on the first dielectric layer along the lengthwise direction of the substrate and for transmitting incident light through the graphene; and a second dielectric layer positioned on the first dielectric layer and the graphene layer.

The first dielectric layer and the second dielectric layer may have the same refractive index.

The optical waveguide may further include: a third dielectric layer positioned between the first dielectric layer and the substrate; a fourth dielectric layer positioned on the second dielectric layer; and first and second electrode layers formed along the lengthwise direction of the substrate between the third electrode layer and the first dielectric layer and between the second dielectric layer and the fourth dielectric layer, respectively.

A set voltage may be applied to the first and second electrode layers. The set voltage may be an alternating current voltage.

The first and second electrode layers may be formed in a stripe shape.

The first and second electrode layers may be formed in such a manner that a path is branched into two paths.

The first and second electrode layers may be made of a metal, and the first and second electrode layers may be made of graphene.

The third dielectric layer may have the same refractive index as the first dielectric layer, and the fourth dielectric layer may have the same refractive index as the second dielectric layer.

When an electrical signal is applied in a horizontal direction to any one of the first electrode layer, the second electrode layer, and the graphene layer, the graphene layer may transmit the electrical signal along with the optical signal.

The graphene layer may be formed in a stripe shape, and the graphene layer may be formed in a film shape.

The first dielectric layer and the second dielectric layer may be made of silicon, silicon nitride, or a polymer for optical devices.

DETAILED DESCRIPTION OF THE EMBODIMENTS

Figure 1:
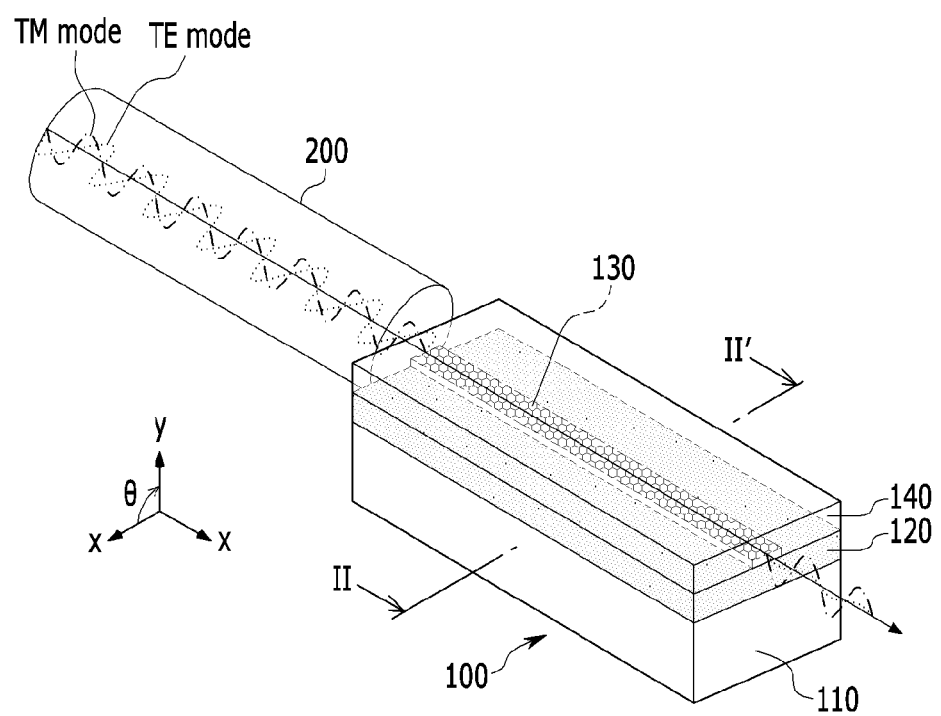
FIG. 1 is a perspective view showing an optical waveguide according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, an optical waveguide according to an exemplary embodiment of the present invention will be described in detail with reference to the accompanying drawings.

Figure 2:
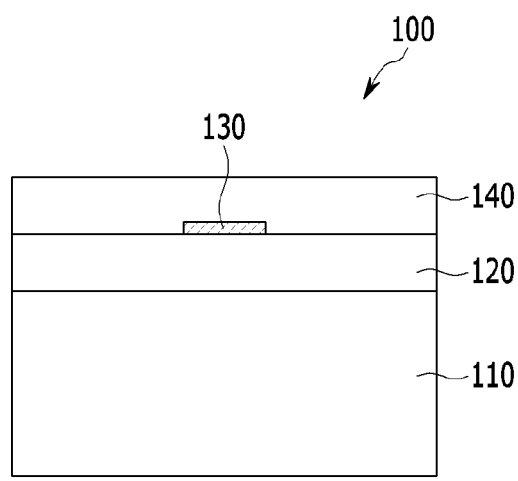
FIG. 2 is a cross-sectional view taken along line II-II' of FIG. 1.

FIG. 1 is a perspective view showing an optical waveguide according to a first exemplary embodiment of the present invention, and FIG. 2 is a cross-sectional view taken along line II-II' of FIG. 1.

Referring to FIG. 1 and FIG. 2, an optical waveguide 100 includes a substrate 110, a first dielectric layer 120 formed on the substrate 110, a graphene layer 130 formed on the first dielectric layer 120, and a second dielectric layer 140 positioned on the graphene layer 130 and the first dielectric layer 120.

The substrate 110 may be made of glass, quartz, silicon, etc.

The first dielectric layer 120 and the second dielectric layer 140 may be made of silicon oxide or silicon nitride, or may be made of a polymer for optical devices that has a low optical waveguide loss.

The first dielectric layer 120 and the second dielectric layer 140 may be made of the same material or different materials.

The refractive index of the first dielectric layer 120 and the refractive index of the second dielectric layer 140 may be the same or different. If the refractive index of the first dielectric layer 120 and the refractive index of the second dielectric layer 140 are different, the difference between the refractive index of the first dielectric layer 120 and the refractive index of the second dielectric layer 140 may be 0.001 or less.

The graphene layer 130 is a very thin layer made of graphene. The graphene layer 130 may be formed in a strip shape along the lengthwise direction of the substrate 110. Graphene, which is a material consisting of carbon atoms connected together in a honeycomb-like thin planar structure, has electrical properties. Carbon atoms are held together to form a single carbon atom layer, and graphene may consist of a single layer or multiple layers of carbon atoms. A single layer graphene 130 has a thickness of one carbon atom. The carbon atoms form six-membered rings, five-membered rings, or seven-membered rings as a repeating unit.

The graphene layer 130 may be formed by a simple photolithography process.

The first dielectric layer 120 and the second dielectric layer 140 may be formed as separate layers as shown in FIG. 1. If the first dielectric layer 120 and the second dielectric layer 140 have the same dielectric constant, they may be formed as a single layer. That is, if the first dielectric layer 120 and the second dielectric layer 140 are formed as a single layer, the graphene layer 130 may be configured in such a manner that it is surrounded by the first dielectric layer 120 and the second dielectric layer 140.

The graphene layer 130 serves to transmit an optical signal incident on the optical waveguide 100 through optical fibers 200, for example.

When light is guided to the surface of graphene, an electronic surface wave, called surface plasmon, is generated. Surface plasmon refers to an oscillating charge density wave which causes free electrons to travel along the interface between the graphene layer 130 and the first dielectric layer 120 and the second dielectric layer 140 having a positive (+) dielectric constant, which is excited by accelerated electrons or optical waves. A plasmonic mode is formed by an interaction between the surface plasmon generated on the graphene layer 130 and photons, and quasi-particles, called surface plasmon polaritons, for transmitting an optical signal are generated by the plasmonic mode. That is, an optical signal can be transmitted by a form of the surface plasmon polaritons. The surface wave consists of an electric field component of light perpendicular to the interface. The surface plasmon polaritons can be excited only in the transverse magnetic (TM) mode.

The transmittable distance of the surface plasmon polaritons excited by light may be limited to several tens or hundreds of micrometers. However, if a graphene layer 130 having a much smaller thickness than the skin depth of an electronic surface wave is used, surface plasmon polaritons generated on both sides of the graphene layer 130 are coupled together to form long-distance surface plasmon polaritons that can be transmitted a long distance of several millimeters or centimeters. The long-distance surface plasmon polaritons can increase the transmission distance of light.

Figure 3:
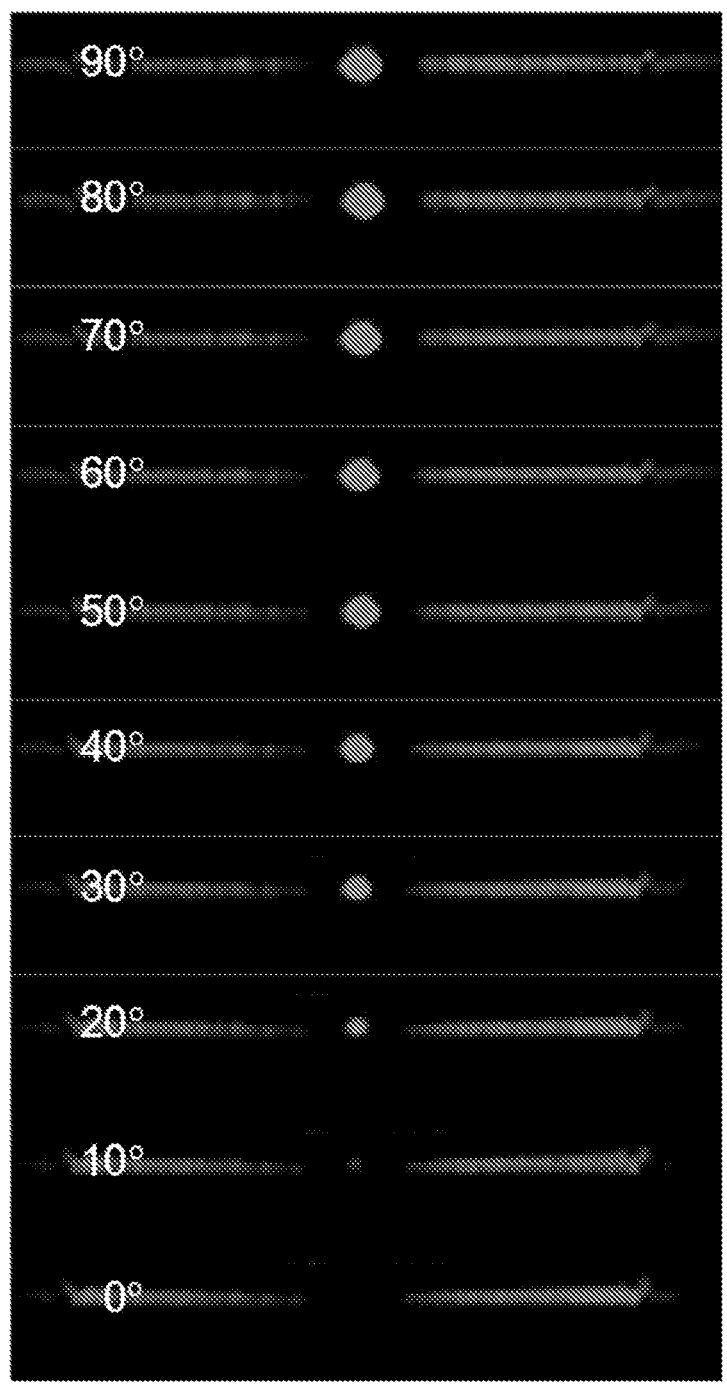
FIG. 3 is a view showing the result of an optical waveguiding test for an optical waveguide according to an exemplary embodiment of the present invention.

FIG. 3 is a view showing the result of an optical waveguiding test for an optical waveguide according to an exemplary embodiment of the present invention.

FIG. 3 illustrates the light output from the graphene layer 130 depending on the polarization (θ) of the light incident on the optical waveguide 100. In FIG. 3, part A represents the light output from the graphene layer 130 at respective polarization angles.

When light is incident on the optical waveguide 100 through the optical fibers 200, the graphene layer 130 transmits the light by the long-distance surface plasmon polariton, and the light output from the graphene layer 130 can be as shown in FIG. 3.

Particularly, as can be seen from FIG. 3, it is found that the graphene layer 130 can transmit the TM-mode component (i.e., θ=90) of incident light with less waveguide loss, as compared to the transverse electric (TE)-mode component (i.e., θ=0).

As such, it is possible to fabricate an optical waveguide which can transmit light even with the use of graphene and is cost-effective compared to a conventional optical waveguide using a variety of expensive semiconductor processes such as etching, deposition, etc.

Moreover, the characteristics of waveguided light can be varied by the use of graphene, thereby enabling optical efficiency control. That is, if an electric field is externally applied in a direction perpendicular to the thin film surface of graphene, the carrier density in the graphene varies. This is similar to a semiconductor property. The graphene acts as a P-type or N-type depending on the direction of the electric field applied to the graphene. For example, if a positive polarity (+) is applied to the top of the graphene and a negative polarity (−) is applied to the bottom of the graphene, the graphene acts as the N-type. Using such a semiconductor characteristic of the graphene, the characteristics of the surface plasmon polaritons excited on the graphene can be varied, and as a result, the characteristics of waveguided light can be varied.

Based on the semiconductor characteristic of the graphene, an increase in the carrier density in the graphene may lead to a decrease in the waveguide loss of surface plasmon polaritons, and as a result, the waveguide loss of light can be reduced, thereby enabling efficient transmission of an optical signal. Next, an exemplary embodiment for increasing the carrier density of graphene will be described with reference to FIGS. 4 and 5.

Figure 4:
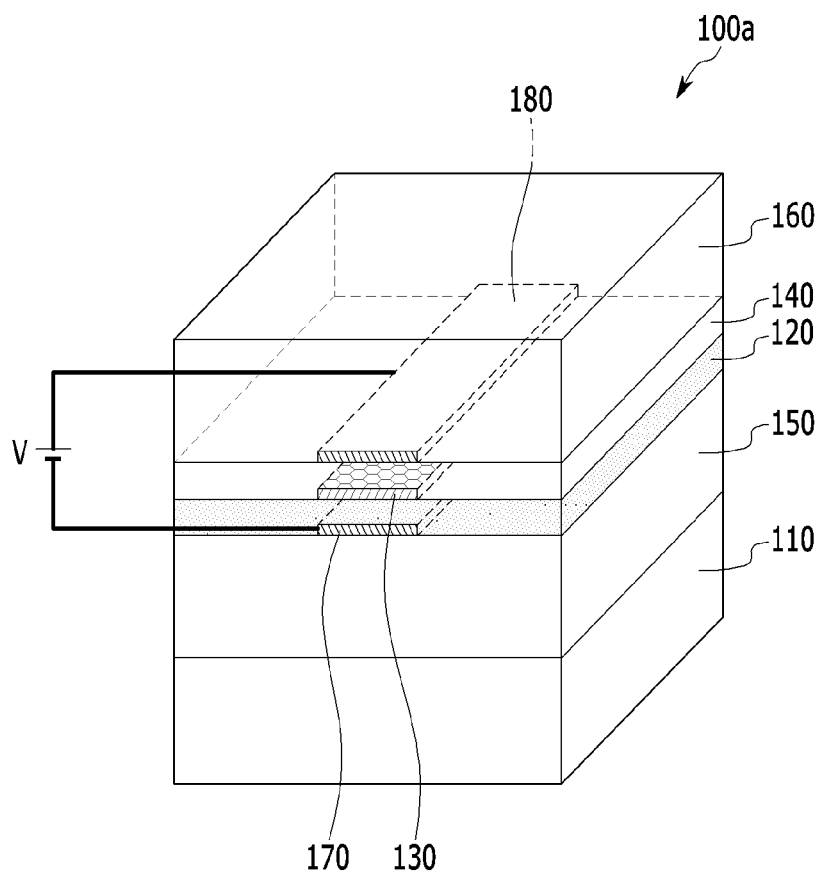
FIG. 4 to FIG. 8 are views showing optical waveguides according to second to sixth exemplary embodiments of the present invention.
Figure 5:
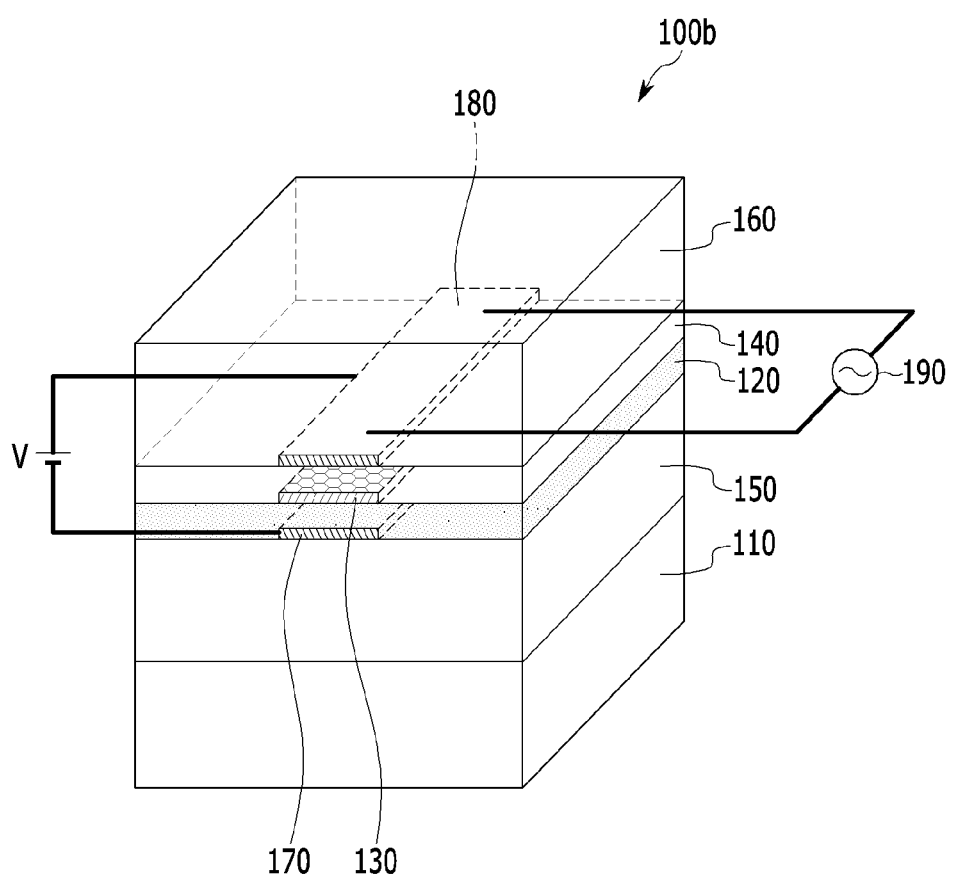
Figure 6:
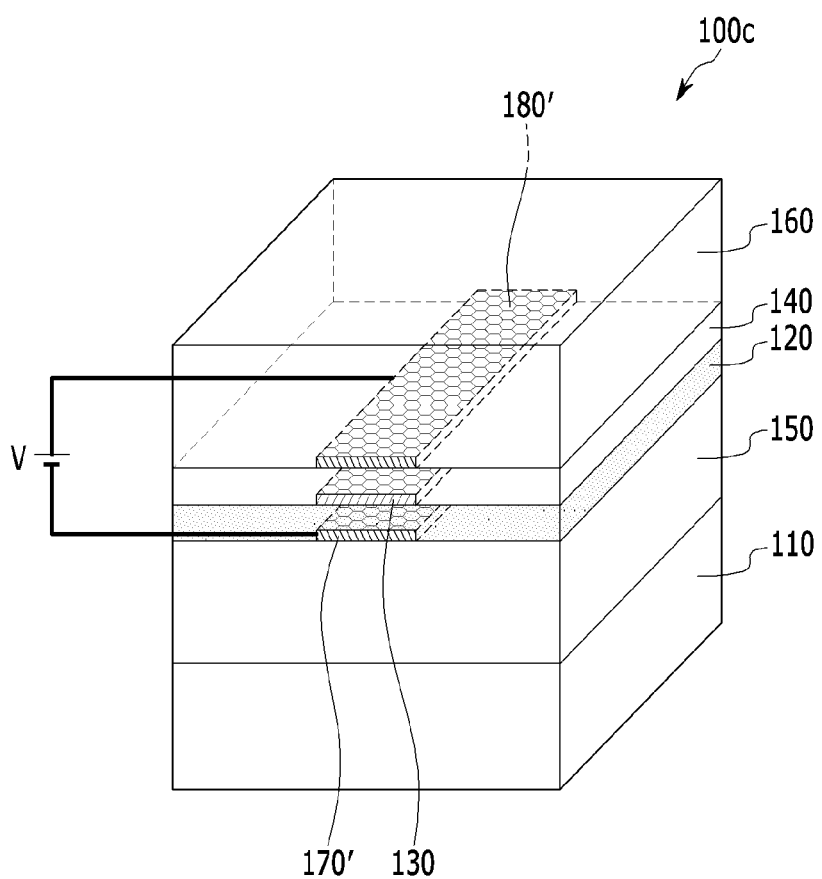

FIG. 4 to FIG. 6 are views showing optical waveguides according to second to fourth exemplary embodiments of the present invention.

First, referring to FIG. 4, the optical waveguide 100a may further include a third dielectric layer 150, a fourth dielectric layer 160, and first and second electrodes 170 and 180, as compared to the optical waveguide 100 according to the first exemplary embodiment.

The third dielectric layer 150 may be positioned between the substrate 110 and the first dielectric layer 120, and have the same material and/or refractive index as the first dielectric layer 120.

The fourth dielectric layer 160 may be positioned on the second dielectric layer 140, and have the same material and/or refractive index as the second dielectric layer 140.

The first electrode layer 170 is positioned on the third dielectric layer 150 between the first dielectric layer 120 and the third dielectric layer 150.

The second electrode layer 180 is positioned on the second dielectric layer 140 between the second dielectric layer 140 and the fourth dielectric layer 160.

The first and second electrode layers 170 and 180 may be formed in a strip shape on the corresponding dielectric layers 150 and 140, corresponding to the graphene layer 130. The first and second electrode layers 170 and 180 may have the same size or not.

The first and second electrode layers 170 and 180 may be made of a metal such as gold (Au), silver (Ag), copper (Cu), aluminum (Al), and so on at a thickness of 10 nm or less.

If the first electrode layer 170 and the second electrode layer 180 are very thin, i.e., no more than 50 nm thick, and the first dielectric layer 120 and the second dielectric layer 140 are very thin, i.e., no more than 1 um thick, the surface plasmon polaritons excited on the first and second electrode layers 170 and 180 and the surface plasmon polaritons excited on the graphene layer 130 are coupled together to form a super-mode. As a result, an optical signal can be transmitted by three different free electron systems.

If a predetermined voltage V is applied to the first electrode layer 170 and the second electrode layer 180, the carrier density in the graphene varies. In this case, the characteristics of surface plasmon polaritons excited on the graphene vary, and an interaction between the first electrode layer 170 and the surface plasmon polaritons excited on the first electrode layer 170 and the second electrode layer 180 varies as well. Thus, the profile of the super-mode and the transmission loss characteristics are changed. Consequently, the intensity of output light may vary, or the coupling efficiency may vary if the output light is coupled to optical fibers.

If a predetermined AC voltage V is applied to the first electrode layer 170 and the second electrode layer 180, the super-mode is in proportion to the alternating current voltage, and as a result, an optical signal waveguided through the graphene layer 130 can be modulated.

Referring to FIG. 5, if the optical waveguide 100b applies an electrical signal 190 in a direction horizontal to the first electrode layer 170, the second electrode layer 180, and the graphene layer 130, the electrical signal, as well as the optical signal, can be simultaneously transmitted through the graphene layer 130. The electrical signal may be a DC or AC electrical signal.

On the contrary, as shown in FIG. 6, the optical waveguide 100c may form first and second electrode layers 170' and 180' by the graphene. That is, the graphene, instead of the metal shown in FIGS. 4 and 5, may be used to form the first and second electrode layers 170' and 180' because the graphene has electrical properties. If the graphene is used to form the first and second electrode layers 170' and 180' and an external voltage is applied thereto, all the performances in FIGS. 4 and 5 can be attained.

Figure 7:
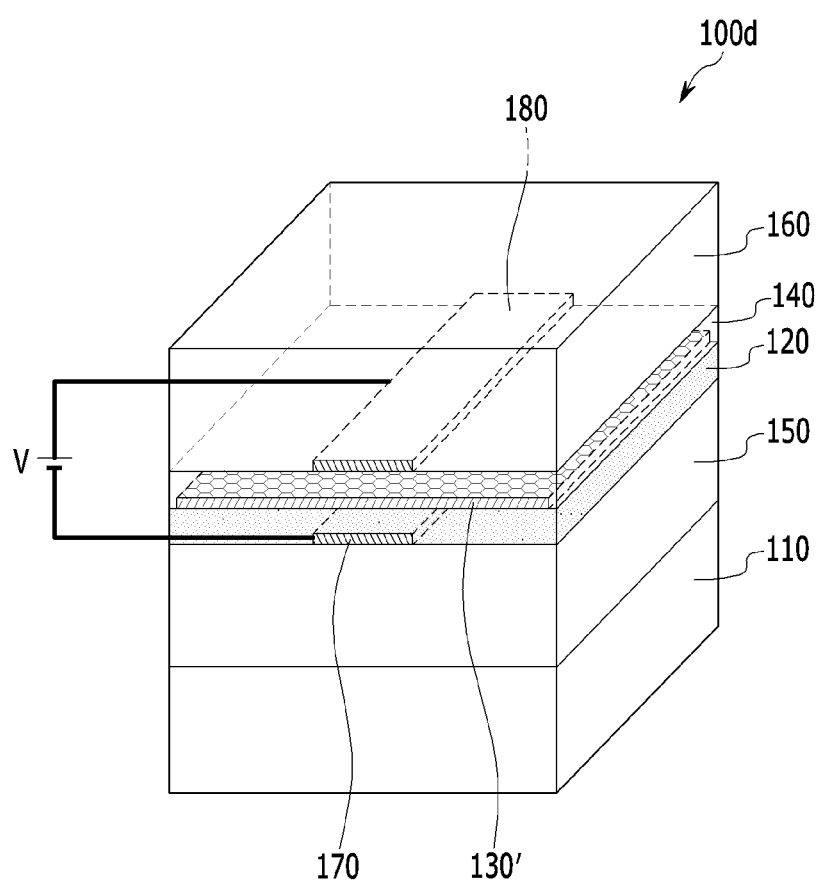
Figure 8:
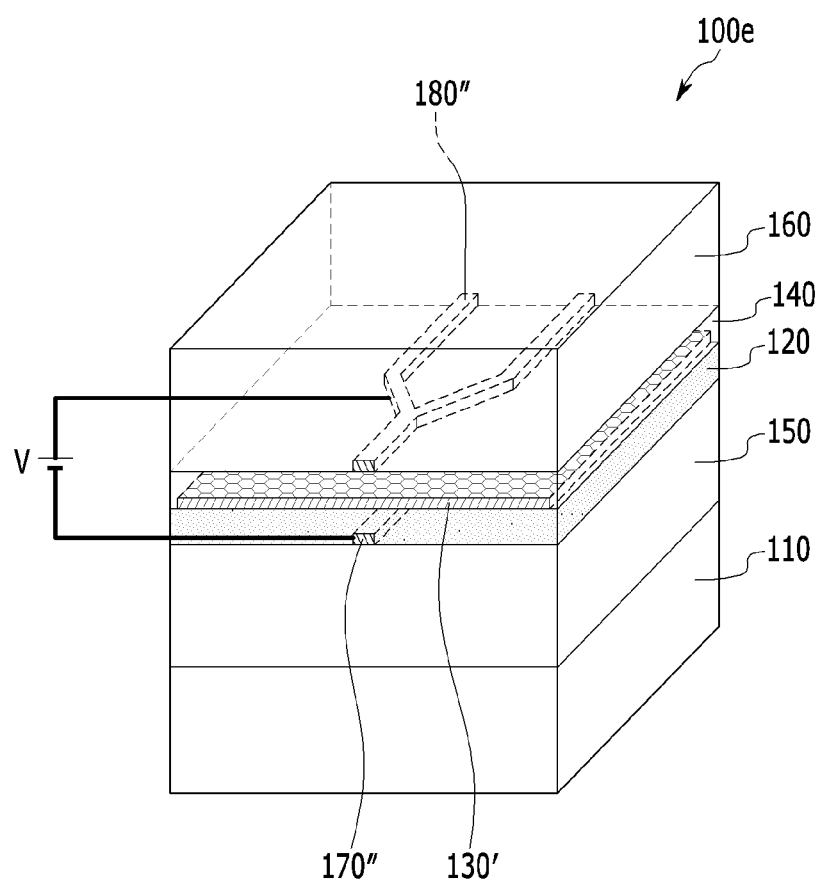

FIG. 7 and FIG. 8 are views showing optical waveguides according to fifth and sixth exemplary embodiments of the present invention.

FIG. 7 and FIG. 8 illustrate modified examples of the optical waveguide shown in FIG. 4, which may be equally applied to the optical waveguide shown in FIGS. 5 and 6.

Referring to FIG. 7, the optical waveguide 100d may be identical to the optical waveguide 100a according to the second exemplary embodiment of FIG. 4, except for the graphene layer 130'.

Graphene of the graphene layer 130' is widely formed in a film shape. By applying a voltage V to the first electrode layer 170 and the second electrode layer 180, the optical signal is waveguided in the region of the graphene layer 130' between the first electrode layer 170 and the second electrode layer 180.

Referring to FIG. 8, the optical waveguide 100e may be identical to the optical waveguide 100d according to the fifth exemplary embodiment of FIG. 7, except for the shape of the first electrode layer 170" and second electrode layer 180".

The first electrode layer 170" may be formed in such a manner that a path is branched as a Y-branch into two paths. Using the first electrode layer 170" and the second electrode layer 180", the optical waveguide 100e branches an incident optical signal and outputs it.

The first electrode layer 170" and the second electrode layer 180" are not limited to the configuration shown in FIG. 7, but a variety of optical circuits may be fabricated according to the configuration of the first electrode layer 170" and the second electrode layer 180".

According to an exemplary embodiment of the present invention, a cost-effective optical waveguide can be fabricated by using graphene. Moreover, a cost-effective optical device can be fabricated by applying the optical waveguide to a functional optical device, for example, an optical coupler, an optical detector, an optical transmission/reception module, an optical modulator, an optical filter, an optical switch, and the like, to which a variety of planar optical circuit structures are applicable.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical waveguide, comprising:
a substrate;
a first dielectric layer formed over the substrate;
a graphene layer formed over the first dielectric layer along a lengthwise direction of the substrate, the graphene layer being configured to generate long-distance surface plasmon polaritons through which an optical signal is transmitted; and
a second dielectric layer formed over the first dielectric layer and the graphene layer.

2. The optical waveguide of claim 1, wherein the first dielectric layer and the second dielectric layer have the same refractive index.

3. The optical waveguide of claim 1, further comprising:
a third dielectric layer positioned between the first dielectric layer and the substrate;
a fourth dielectric layer formed on the second dielectric layer;
a first electrode layer formed between the third electrode layer and the first dielectric layer along the lengthwise direction of the substrate; and
a second electrode layer formed between the second dielectric layer and the fourth dielectric layer along the lengthwise direction of the substrate.

4. The optical waveguide of claim 3, wherein a set voltage is applied to the first and second electrode layers.

5. The optical waveguide of claim 4, wherein the set voltage is an alternating current voltage.

6. The optical waveguide of claim 3, wherein the first and second electrode layers are formed in a stripe shape.

7. The optical waveguide of claim 3, wherein the first and second electrode layers are formed in such a manner that a path is branched into two paths.

8. The optical waveguide of claim 3, wherein the first and second electrode layers are made of a metal.

9. The optical waveguide of claim 3, wherein the first and second electrode layers are made of graphene.

10. The optical waveguide of claim 3, wherein the third dielectric layer has a refractive index the same as the first dielectric layer, and the fourth dielectric layer has a refractive index the same as the second dielectric layer.

11. The optical waveguide of claim 3, wherein an electrical signal is applied to the first electrode layer, the second electrode layer, and the graphene layer in a horizontal direction, and the graphene layer transmits the electrical signal along with the optical signal.

12. The optical waveguide of claim 1, wherein the graphene layer is formed in a stripe shape.

13. The optical waveguide of claim 1, wherein the graphene layer is formed in a film shape.

14. The optical waveguide of claim 1, wherein the first dielectric layer and the second dielectric layer are made of silicon, silicon nitride, or a polymer for optical devices.

15. An optical waveguide, comprising:
a substrate;
a third dielectric layer formed on the substrate;
a first electrode layer formed on the third dielectric layer;
a first dielectric layer formed on the first electrode layer;
a graphene layer formed on the first dielectric layer along a lengthwise direction of the substrate;
a second dielectric layer formed on the first dielectric layer and the graphene layer;
a second electrode layer formed on the second dielectric layer; and
a fourth dielectric layer formed on the second electrode layer,
wherein the first and the second electrode layers, the first and the second dielectric layers, and the graphene layers are configured such that first surface plasmon polaritons generated on the first electrode layer, second surface plasmon polaritons generated on the second electrode layer, and third surface plasmon polaritons generated on the graphene layer are coupled to form a super-mode through which an optical signal is transmitted.

16. The optical waveguide of claim 15, wherein the first dielectric layer and the third dielectric layer have the same refractive index, and wherein the second dielectric layer and the fourth dielectric layer have the same refractive index.

17. The optical waveguide of claim 15, wherein an external voltage is applied to the first and second electrode layers to vary characteristics of the super-mode.

18. The optical waveguide of claim 17, wherein the external voltage is an alternating current voltage.

19. The optical waveguide of claim 15, wherein an electrical signal is applied to the first electrode layer, the second electrode layer, and the graphene layer in a horizontal direction such that the graphene layer transmits the electrical signal and the optical signal simultaneously.

* * * * *